United States Patent [19]

Lee et al.

[11] Patent Number: 6,085,268
[45] Date of Patent: Jul. 4, 2000

[54] PORTABLE INFORMATION TERMINAL/ METHOD FOR RENEWING PROGRAMS USING PC CARD WITH UTILITY PROGRAMS ON PC CARD DISPLAYED FOR SELECTION ACCORDING TO CONTROL SIGNAL FROM CONTROLLER

[75] Inventors: Jin-chul Lee, Anyang; Chae-hee Won, Seoul; Je-hyoung Lee, Yongin, all of Rep. of Korea

[73] Assignee: Samsung Electronics Co., Ltd., Kyungki-Do, Rep. of Korea

[21] Appl. No.: 09/037,877

[22] Filed: Mar. 10, 1998

[30] Foreign Application Priority Data

Apr. 11, 1997 [KR] Rep. of Korea .................... P97-13422

[51] Int. Cl.$^7$ ............................ G06F 9/445; G06F 13/00; G06F 12/00
[52] U.S. Cl. .............................. 710/72; 710/2; 710/102; 710/103; 395/712; 711/100; 711/115; 707/200; 707/203; 707/500; 707/511; 364/968
[58] Field of Search .................................. 710/1–19, 62, 710/72, 102, 103; 395/712, 821, 822, 833, 882, 892, 282, 283, 442, 427, 651, 652, 653; 711/100, 115; 707/200, 203, 500, 511; 713/1, 2, 100; 364/222.81, 222.82, 238.3, 963, 962.1, 962.4, 968

[56] References Cited

U.S. PATENT DOCUMENTS

| | | | |
|---|---|---|---|
| 4,556,954 | 12/1985 | Advani et al. .......................... | 364/900 |
| 4,954,941 | 9/1990 | Redman ................................ | 364/200 |
| 5,471,674 | 11/1995 | Stewart et al. ......................... | 395/650 |
| 5,577,244 | 11/1996 | Killebrew et al. ..................... | 395/703 |
| 5,579,522 | 11/1996 | Christeson et al. .................... | 395/652 |
| 5,590,373 | 12/1996 | Whitley et al. ........................ | 710/8 |
| 5,613,092 | 3/1997 | Lim et al. .............................. | 710/102 |
| 5,628,028 | 5/1997 | Michelson ............................. | 710/8 |
| 5,630,139 | 5/1997 | Ozaki .................................... | 395/712 |
| 5,687,346 | 11/1997 | Shinohara ............................. | 711/130 |
| 5,712,969 | 1/1998 | Zimmermann et al. ................ | 714/5 |
| 5,742,742 | 4/1998 | Ueda .................................... | 395/109 |
| 5,752,040 | 5/1998 | Kaneko et al. ........................ | 395/712 |
| 5,764,992 | 6/1998 | Kullick et al. ......................... | 395/712 |
| 5,784,611 | 7/1998 | Thantrakul ............................ | 713/1 |
| 5,835,761 | 11/1998 | Ishii et al. ............................. | 395/653 |
| 5,835,933 | 11/1998 | Wells et al. ........................... | 711/103 |
| 5,838,981 | 11/1998 | Gotoh ................................... | 395/712 |
| 5,844,796 | 12/1998 | Araki .................................... | 364/191 |
| 5,845,114 | 12/1998 | Cloud ................................... | 713/1 |
| 5,848,247 | 12/1998 | Matsui et al. ......................... | 710/104 |
| 5,928,336 | 7/1999 | Takeuchi .............................. | 710/1 |
| 5,930,504 | 7/1999 | Gabel ................................... | 395/712 |

*Primary Examiner*—Thomas C. Lee
*Assistant Examiner*—Raju Tamrakar
*Attorney, Agent, or Firm*—Sughrue, Mion, Zinn, Macpeak & Seas, PLLC

[57] ABSTRACT

A portable information terminal capable of updating a program using a PC card, and a method for updating a program using the same, are provided. The portable information terminal is capable of updating a pre-stored program using a card in which a new program to be updated and a utility program for performing an updating operation are stored. The terminal includes a card unit for reading or writing the new program and the utility program stored in the card, a program storage unit for replacing the pre-stored program with the new program stored in the card and storing the new program, a memory for temporarily storing the new program and the utility program read by the card unit, and a controller for controlling the execution of the utility program stored in the memory so that the new program stored in the memory can be stored in the program storage unit. Thus, a program is correctly updated without an additional special device.

12 Claims, 4 Drawing Sheets

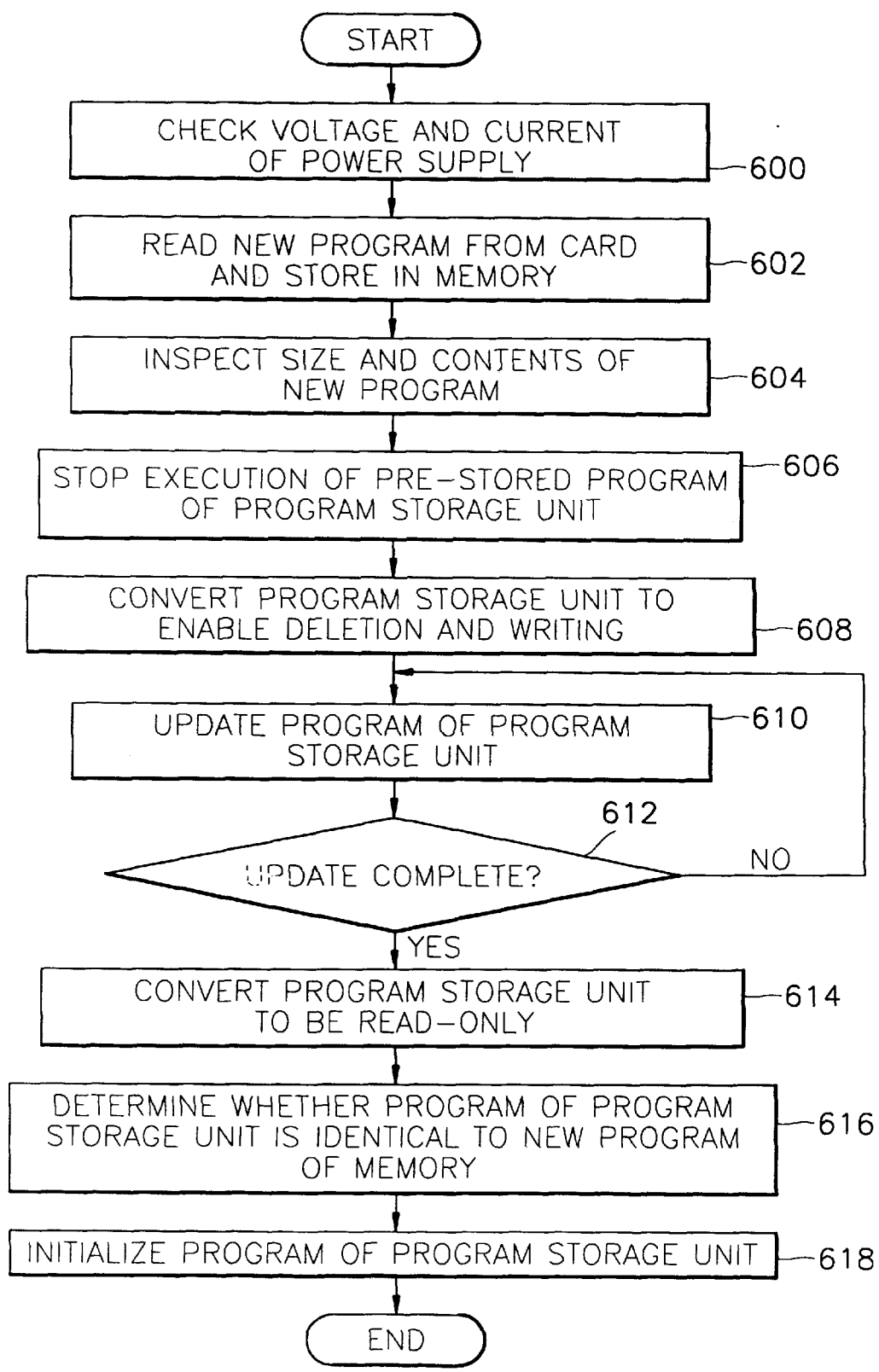

PORTABLE INFORMATION TERMINAL/ METHOD FOR RENEWING PROGRAMS USING PC CARD WITH UTILITY PROGRAMS ON PC CARD DISPLAYED FOR SELECTION ACCORDING TO CONTROL SIGNAL FROM CONTROLLER

FIELD OF THE INVENTION

The present invention relates to a portable information terminal using a correctable memory such as an EPROM, and more particularly, to a portable information terminal for renewing a program using a PCMCIA (Personal Computer Memory Card Interface Association) card or a PC (Personal Computer) card similar to the PCMCIA card, and a method for renewing a program recorded in a memory.

The present application is based upon Korean Application No. 97-13422, which is incorporated herein by reference.

BACKGROUND OF THE INVENTION

A portable information terminal is not capable of providing various functions such as those furnished by a general computer since it must be as small as possible. Also, since current consumption and the weight of the portable information terminal must be reduced, it is difficult to install an auxiliary storage device such as a hard disk drive on the portable information terminal. Accordingly, portable information terminals typically use a small capacity ROM and RAM or a memory having similar characteristics. The ROM is low-priced, but the programs recorded thereon cannot be changed. In addition, although a RAM can easily change the programs recorded thereon, it is expensive and can be easily damaged by power failure.

Most portable information terminals can provide only a small number of programs and it is costly to add a new program or change the program that is already provided. There are also portable information terminals on which programs cannot be added or changed and portable information terminals on which only some programs can be added or changed. The portable information terminal is not only used as a simple electronic pocketbook but can also be used to conduct business outside the office. Accordingly, in order for the portable information terminal to be employed for business, it should be possible to install powerful programs necessary for business and also to change or add programs to suit the user's business needs.

FIG. 1 is a block diagram of the configuration of a conventional portable information terminal. Referring to FIG. 1, the conventional information terminal is comprised of a ROM 100, a RAM 102, a PCMCIA card 104, a power supply 106, a decoder 108, an optional connector 110, a connector receptacle 112, a PCMCIA card receptacle 114 and a controller 116. The ROM 100 stores predetermined program data and the RAM 102 stores a utility program that is operated to enable replacement of the program recorded in the ROM 100 with a new program. The PCMCIA card 104 stores the new programs which replace programs recorded in the ROM 100 and the utility program for updating the new program. In addition, the decoder 108 is connected to the power supply 106 and to the ROM 100 for determining the available power and selectively applying power to the ROM 100 based upon the power determination. The optional connector 110 is used to inform the terminal that the PCMCIA card 104 is inserted using a combination of specific bits. Connector receptacle 112 connected to the decoder 108 receives the optional connector 110. The PCMCIA card receptacle 114 receives the PCMCIA card 104.

Finally, the controller 116 controls the entire operation of the portable information terminal.

Here, the PCMCIA card 104 has stored a new program to replace or update the existing program pre-recorded in the ROM 100 and a utility program that functions to replace or update the existing program with the new program. In order to update the ROM 100 with a new program, the utility program and the new updating program are temporarily transferred to the RAM 102.

The above-described conventional technique, disclosed in U.S. Pat. No. 5,590,373, requires special devices, such as the optional connector 110 and the connector receptacle 112, to add or update a new program to be recorded in the ROM 100 and, therefore, also requires extra expense.

SUMMARY OF THE INVENTION

It is an object of the present invention to provide a portable information terminal capable of updating a program using only a PC card without additional special devices.

It is another object of the present invention to provide a method of updating a program in a portable information terminal.

To accomplish the first object, a portable information terminal is provided which is capable of updating a pre-stored program using a card having a new updating program and a utility program for performing an updating operation stored therein. The terminal includes a card unit for reading or writing the new updating program and the utility program stored in the card, a program storage unit for replacing and storing the pre-stored program with the new updating program stored in the card, a memory for temporarily storing the new updating program and the utility program read by the card unit, and a controller for controlling the execution of the utility program stored in the memory, so that the new program stored in the memory can be stored in the program storage unit.

According to the present invention, the portable information terminal further includes a display for displaying information on a plurality of utility programs stored in the card according to a control signal of the controller when there are the plurality of utility programs, and an input unit for selecting one of the plurality of utility programs displayed on the display.

To accomplish the second object, a method is provided which updates a program pre-stored in a program storage unit with a new program for a portable information terminal including a card unit for reading or writing data stored in an externally insertable card, a display for displaying a plurality of utility programs read by the card unit, and a memory for temporarily storing the new program and the utility program read by the card unit. The method is comprised of: (a) selecting a desired utility program among the plurality of utility programs displayed on the display, and storing the selected utility program in the memory; (b) reading the new program stored in the card by the execution of the utility program and storing the same in the memory, and checking the size and contents of the stored new program; (c) stopping the execution of the pre-stored program by the execution of the utility program, and converting the program storage unit to enable writing and deletion; (d) deleting the pre-stored program of the program storage unit, transferring the new program stored in the memory to the program storage unit, and storing the transferred new program therein by the execution of the utility program; (e) converting the program storage unit to be in a read-only state by the execution of the utility program; (f) determining whether the new program stored in the program storage unit is same as that stored in the memory by the execution of the utility program; and (g) initializing the new program stored in the program storage unit by the execution of the utility program.

According to the present invention, step (b) also includes reading the new programs stored in the card and storing the new programs in the memory, or sequentially reading some of the new programs stored in the card and storing them in the memory.

Also, in the step (d), the new programs stored in the memory are either all read and stored in the program storage unit, or some of the new programs stored in the memory are sequentially read and stored in the program storage unit.

BRIEF DESCRIPTION OF THE DRAWINGS

The above objects and advantages of the present invention will become more apparent by describing in detail a preferred embodiment thereof with reference to the attached drawings in which:

FIG. 6 is a flowchart outlining a method of updating the pre-stored program stored in the program storage unit to the new program using the utility program according to the present invention.

DETAILED DESCRIPTION OF THE INVENTION

Figure 1:
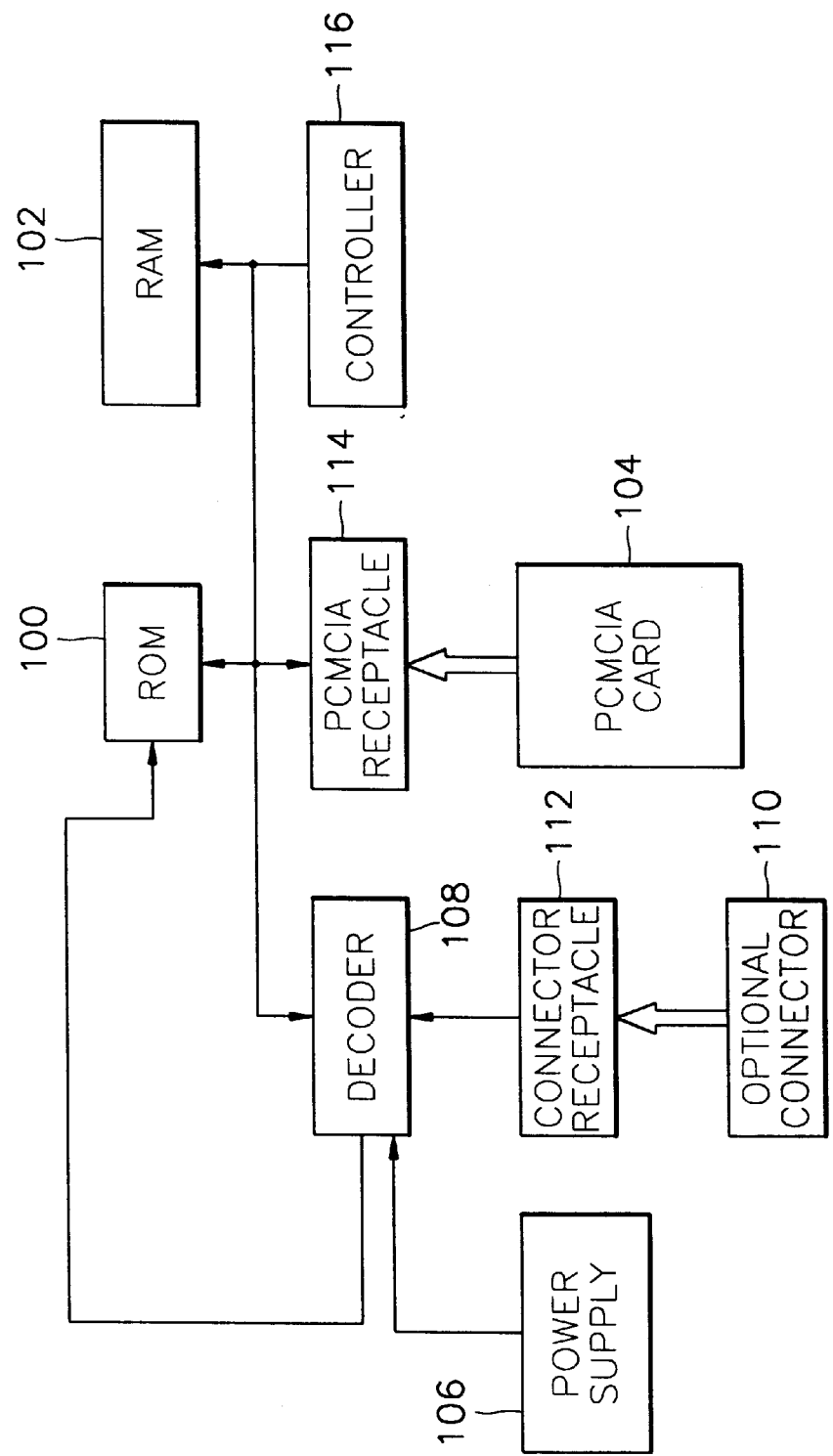
FIG. 1 is a block diagram of the configuration of a conventional portable information terminal.
Figure 2:
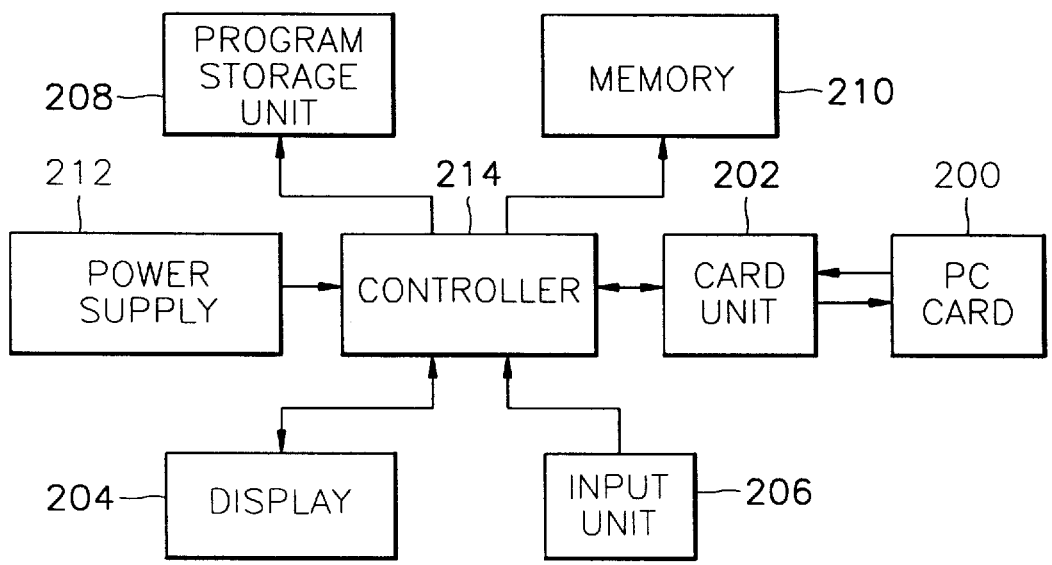
FIG. 2 is a block diagram of the configuration of a portable information terminal according to the present invention.

Referring to FIG. 2, the portable information terminal according to the present invention includes a PC card 200, a card unit 202, a display 204, an input unit 206, a program storage unit 208, a memory 210, a power supply 212 and a controller 214. The card 200 stores a new updating program and a utility program for performing the updating operation.

The card unit 202 reads or writes the new and utility programs stored in the inserted card 200. Display 204 displays information concerning the utility program stored in the card 200 according to a predetermined control signal. Input unit 206 is used to select the utility programs displayed on the display 204. Program storage unit 208 replaces the pre-stored program with the new updating program stored in the card 200, and also stores the replaced program. The freely readable and writable memory 210 temporarily stores the new and utility programs.

Power supply 212 supplies the power necessary for replacing the pre-stored program stored in the program storage unit 208 with the new updating program and for storing the replaced program.

The controller 214 controls the operation of the utility program stored in the memory 210, controls the display 204 to display the utility program, receives the command from the input unit 206 and controls the new program temporarily stored in the memory 210 so that it can be stored in the program storage unit 208. That is, the controller 214 controls the new and utility programs stored in the card 200 inserted into the card unit 202 to be transferred to the memory 210, and then controls the utility program to be executed. Also, in the program storage unit 208, the utility program is operated by a control signal from the controller 214 so that the pre-stored program is replaced by the new program. The program storage unit 208 stores a basic program and data in an EPROM or a flash memory, for example, in order to prevent loss of stored data even when insufficient voltage is supplied or no power is supplied, and also to delete or operate the stored data when an excessive voltage is supplied. However, under normal conditions, the content of the program storage unit 208 does not change.

Figure 3:
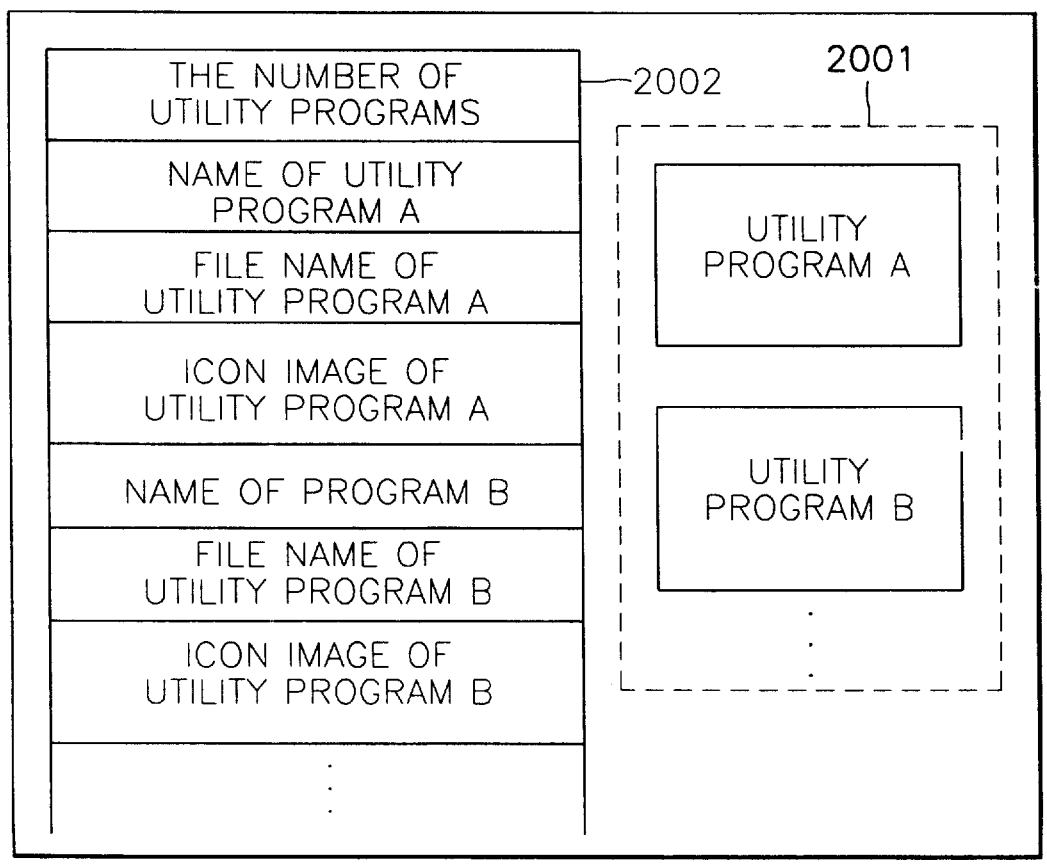
FIG. 3 is an example of a PC card according to the present invention, which shows an area where a plurality of new and utility programs are stored.

The card 200 can store one new program and one utility program, or a plurality of new and utility programs. As an example, FIG. 3 shows the area of the card 200 in the case where a plurality of new and utility programs are stored. In this example, the card 200 includes an area 2001 for storing a plurality of utility programs and an area 2002 for representing information of each of the utility programs. The area 2002 representing the information on the utility program includes subareas respectively indicating the number of utility programs, the names of each of the utility programs, and the icon images thereof.

Figure 4:
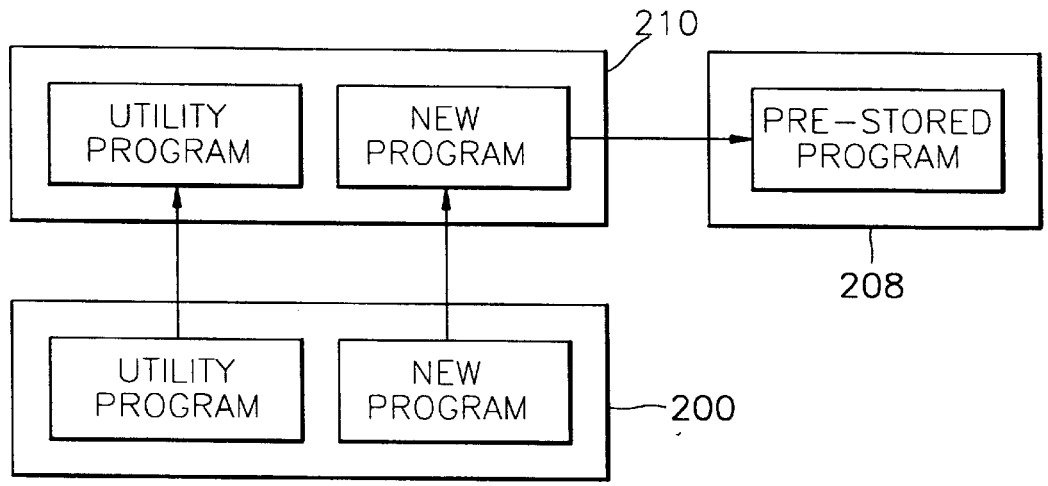
FIG. 4 shows the movement paths of the new and utility programs stored in the PC card according to the present invention during transfer to a memory unit, and the program pre-stored in a program storage unit being updated by the new program.

FIG. 4 shows the movement path along which the pre-stored program stored in the program storage unit 208 is replaced by the new program by transferring the new and utility programs stored in the card 200 to the memory 210. As shown, the new and utility programs stored in the card 200 are temporarily stored in the memory 210 of a portable information terminal. The utility program is then operated so that the new program stored in the memory 210 can replace the pre-stored program in the program storage unit 208.

Figure 5:
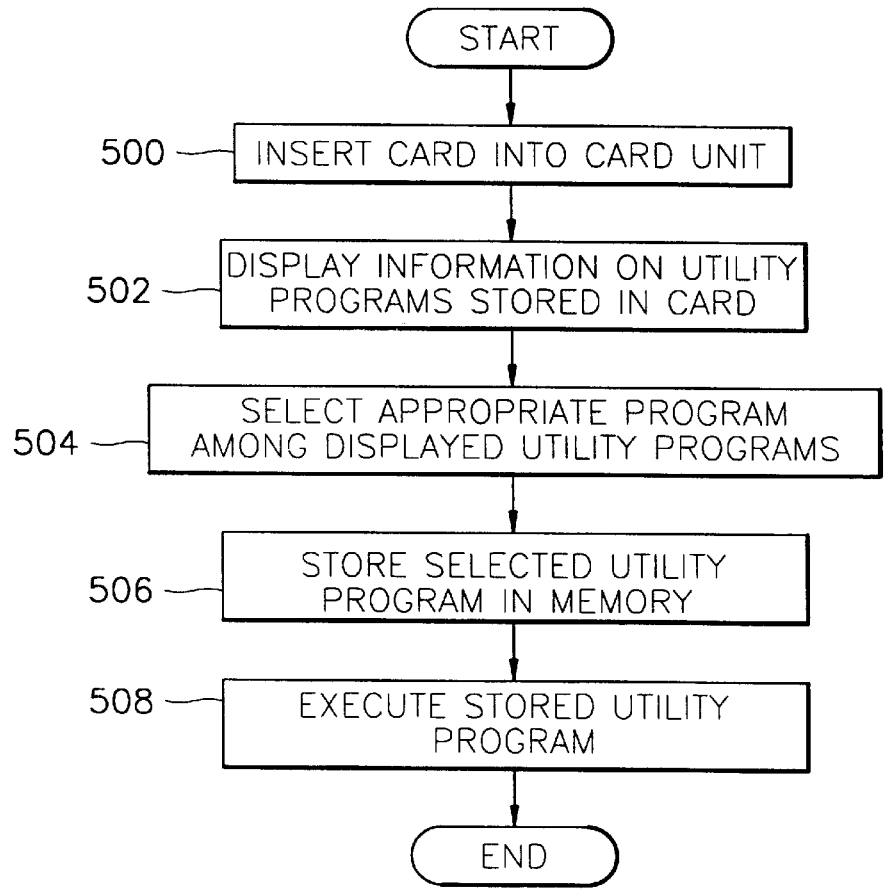
FIG. 5 is a flowchart outlining a method of executing the utility program for program updating, according to the present invention.

FIG. 5 is a flowchart illustrating a method of executing the utility program for program renewal in the apparatus shown in FIG. 2, according to the present invention.

FIG. 6 is a flowchart outlining a method of updating the pre-stored program stored in the program storage unit 208 to the new program transferred to the memory 210 of FIG. 2, using the utility program, according to the present invention.

Referring to FIG. 5, the card 200 is inserted into the card unit 202 as shown in step 500. Information concerning the utility programs stored in the card 200 are displayed on display 204 in step 502. Next, as shown in step 504, a user selects an appropriate program among the utility programs displayed on the display 204 through the input unit 206. The selected utility program is then stored in a predetermined area of the memory 210 to be enable its execution, as demonstrated in step 506. Finally, in step 508 the stored utility program is executed according to the control signal of the controller 214.

An example of the type of information contained in the utility program in the card 200 includes storing the number of the utility programs, the names of each program, and small icons representing the function of each program in a predetermined directory. Also, an example of a display format for the utility program on the display 204 includes displaying together the names of the utility programs, the arbitrarily-assigned numbers of each program, and small icons representing the functions thereof.

In addition, an example of a method in which a user selects the utility programs displayed on the display 204 is described as follows. First, in an apparatus where coordinates corresponding to each pixel of the display 204 are input via the input unit 206, the user selects the coordinates of an area occupied by an image icon of the utility program displayed on the display 204. Second, in an apparatus where the input unit 206 inputs numbers or letters, the user inputs the number of the utility program displayed on the display 204.

Now, a method for updating the pre-stored program stored in the program storage unit 208 with the new program using the utility program transferred to the memory 210, will be described with reference to FIG. 6. First, the utility program transferred to the memory 210 checks whether the power supply 212 can supply a sufficient voltage and current necessary for updating the program of the program storage unit 208, as shown in step 600. The new program stored in the card 200 is then read and stored in the memory 210 in step 602. Next, the size and contents of the new program are inspected as indicated in step 604.

Subsequently in step 606, the utility program permanently stores or deletes arbitrary data pre-stored in the memory 210 to secure a sufficient space in the memory 210 for the new program. Here, while the program of the program storage unit 208 is updated, the program of the program storage unit 208 should not be operated. The utility program then converts the program storage unit 208 to enable deletion and writing in step 608.

The utility program transfers the new program stored in the memory 210 to the program storage unit 208 and updates the pre-stored program to the new program in step 610. Here, when the memory 210 has sufficient capacity, all of the new programs stored in the card 200 are stored in the memory 210, and then transferred to the program storage unit 208. When the capacity of the memory 210 is not sufficient to store all of the new programs stored in the card 200, only a portion of the new programs stored is stored in the memory 210 and then transferred to the program storage unit 208. Meanwhile, in order to transfer the new program stored in the memory 210 to the program storage unit 208, the utility program is executed so that one block of the pre-stored program in the program storage unit 208 can be deleted, and the new program can be transferred to and stored in the block which has been occupied by the pre-stored program. The utility program determines whether updating of the program storage unit 208 is finished or not, in step 612. If the new program is not completely updated, the utility program continues the program updating step 610.

When the updating is completed, the program storage unit 208 is made to be read only in step 614. The utility program then determines whether the program of the program storage unit 208 was correctly updated or not in step 616. That is, a comparison and determination are made as to whether the program stored in the program storage unit 208 is identical to that stored in the memory 210. Here, as an example, the check sum of the programs stored in the program storage unit 208 is calculated.

When the program of the program storage unit 208 is correctly updated, the utility program initializes the new program stored in the program storage unit 208, as shown in step 618.

According to the above-described portable information terminal capable of updating a program using a PC card and a method for updating a program using the same, a desired program in the present invention can be correctly updated using only the PC card without using special devices.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A portable information terminal capable of updating a pre-stored program using a card in which a new program for updating said pre-stored program and a utility program for performing an updating operation are stored, said terminal comprising:

a card unit for reading and writing said new program and said utility program stored in said card;

a program storage unit for replacing said pre-stored program with said new program stored in said card and storing said new program;

a memory for temporarily storing said new program and said utility program read by said card unit;

a controller for controlling the execution of said utility program stored in said memory, so as to enable said new program stored in said memory to be stored in said program storage unit;

a display for displaying information concerning said utility program stored in said card according to a control signal from said controller; and an input unit for selecting said utility program from said display.

2. The portable information terminal capable of updating a program, as claimed in claim 1, further comprising:

a power supply for providing power to replace said pre-stored program stored in said program storage unit with said new program and for storing the same.

3. An updating method for use in a portable information terminal wherein a program pre-stored in a program storage unit is replaced with a new program, said portable information terminal includes a card unit for reading or writing data stored in an externally insertable card, a controller, a display for displaying a plurality of utility programs read by said card unit, a memory for temporarily storing said new program and said plurality of utility programs read by said card unit, said method comprising the steps of:

(a) selecting a desired utility program from said plurality of utility programs displayed on said display, displaying information concerning at least said selected utility program according to a control signal from the controller, and storing said selected utility program in said memory;

(b) reading said new program stored in said card by executing said selected utility program stored in said memory and storing the same in said memory, thereafter checking the size and contents of said new program stored in said memory;

(c) stopping the execution of said pre-stored program by executing said selected utility program, and converting said program storage unit from a read-only state to enable writing and deletion;

(d) deleting said pre-stored program from said program storage unit, transferring said new program stored in said memory to said program storage unit, and storing said transferred new program therein by executing said selected utility program;

(e) converting said program storage unit to a read-only state by executing said selected utility program;

(f) determining whether said new program stored in said program storage unit is the same as said new program stored in said memory by executing said selected utility program; and (g) initializing said new program stored in said program storage unit by executing said selected utility program.

4. The program updating method in a portable information terminal as claimed in claim 3, wherein step (a) further includes checking whether a power supply supplying power to said memory is able to supply a voltage and a current necessary for updating said pre-stored program in said memory with said new program by executing said selected utility program.

5. A portable information terminal capable of updating a pre-stored program using a card in which at least one new program for updating said pre-stored program and at least one utility program for performing an updating operation are stored, said terminal comprising:

- a card unit for reading and writing said at least one new program and said at least one utility program stored in said card;
- a program storage unit for replacing said pre-stored program with said at least one new program stored in said card and storing said at least one new program;
- a memory for temporarily storing said at least one new program and said at least one utility program read by said card unit;
- a controller for controlling the execution of said at least one utility program stored in said memory so that said at least one new program stored in said memory can be stored in said program storage unit;
- a display for displaying information concerning said at least one utility program stored in said card according to a control signal from said controller; and
- an input unit for selecting any number of said at least one utility program from said display.

6. The portable information terminal capable of updating a program, as claimed in claim 5, further comprising:

- a power supply for providing power to replace said pre-stored program stored in said program storage unit with said at least one new program and for storing the same.

7. An updating method for use in a portable information terminal wherein at least one program pre-stored in a program storage unit is replaced with at least one new program, said portable information terminal includes a card unit for reading or writing data stored in an externally insertable card, a controller, a display for displaying all utility programs read by said card unit, a memory for temporarily storing said new programs and said utility programs read by said card unit, said method comprising the steps of:

(a) selecting a desired utility program from among said utility programs displayed on said display, displaying information concerning at least said selected utility program according to a control signal from the controller, and storing said selected utility program in said memory;

(b) reading said new programs stored in said card by executing said selected utility program and storing the same in said memory, thereafter checking the size and contents of each of said new programs stored in said memory;

(c) stopping the execution of said pre-stored program by executing said selected utility program, and converting said program storage unit from a read-only state to enable writing and deletion;

(d) deleting said pre-stored program from said program storage unit, transferring said new programs stored in said memory to said program storage unit, and storing said transferred new programs therein by executing said selected utility program;

(e) converting said program storage unit to a read-only state by executing said selected utility program;

(f) determining whether said new programs stored in said program storage unit are the same as those stored in said memory by executing said selected utility program; and (g) initializing said new programs stored in the program storage unit by executing said selected utility program.

8. The program updating method for a portable information terminal as claimed in claim 7, wherein in said step (b) all of said new programs stored in said card are read and stored in said memory.

9. The program updating method in a portable information terminal as claimed in claim 7, wherein in said step (b) a portion of said new programs stored in said card are sequentially read and stored in said memory.

10. The program updating method for a portable information terminal as claimed in claim 7, wherein in said step (d) all of said new programs stored in said memory are read and stored in said program storage unit.

11. The program updating method for a portable information terminal as claimed in claim 7, wherein in said step (d) a portion of said new programs stored in said memory are sequentially read and stored in said program storage unit.

12. The program updating method for a portable information terminal as claimed in claim 7, wherein step (a) includes checking whether a power supply supplying power to said memory is able to supply a voltage and a current necessary for updating said pre-stored program with said new programs.

* * * * *